United States Patent [19]
Babb et al.

[11] Patent Number: 4,795,175
[45] Date of Patent: Jan. 3, 1989

[54] NIPPLE CHUCK

[75] Inventors: Larry F. Babb, LaGrange; Michael J. Rutkowski, Brunswick, both of Ohio

[73] Assignee: Emerson Electric Co., St. Louis, Mo.

[21] Appl. No.: 87,523

[22] Filed: Aug. 20, 1987

[51] Int. Cl.⁴ .............................................. B25B 1/20
[52] U.S. Cl. ................................... 279/1 A; 269/163; 269/264; 269/278; 279/7; 279/123
[58] Field of Search .................. 279/1 A, 7, 55, 35, 279/106, 123; 269/163, 264, 277, 278

[56] References Cited

U.S. PATENT DOCUMENTS

| | | | |
|---|---|---|---|
| 154,345 | 8/1874 | Saunders | 279/7 |
| 346,310 | 7/1886 | O'Neill | 279/107 |
| 409,108 | 8/1889 | Leighton | 279/7 |
| 500,820 | 7/1893 | Saunders | 279/7 |
| 958,980 | 5/1910 | Thomas | 279/7 |
| 1,326,075 | 12/1919 | McGee et al. | 279/7 |
| 2,216,557 | 10/1940 | McKean | 279/37 |
| 2,405,018 | 7/1946 | Crowley | 279/35 |
| 2,448,342 | 8/1948 | Zagar | 279/35 |
| 2,525,857 | 10/1950 | Bodmer | 279/35 |
| 2,788,980 | 4/1957 | Black | 279/7 |
| 2,792,230 | 5/1957 | Schober | 279/7 |
| 2,868,550 | 1/1959 | Maryanski et al. | 279/50 |
| 3,159,408 | 12/1964 | Sanchez et al. | 279/35 |
| 3,777,356 | 12/1973 | Hemingway | 29/428 |
| 4,235,134 | 11/1980 | McLendon | 81/91 |

Primary Examiner—Gil Weidenfeld
Assistant Examiner—Steven C. Bishop
Attorney, Agent, or Firm—Body, Vickers & Daniels

[57] ABSTRACT

A nipple chuck for holding a pipe nipple blank in a power driven threading machine is comprised of three arcuate sleeve segments engaged between the jaws of the threading machine chuck. The segments are internally threaded at the front ends thereof and are pivotally supported adjacent the rear ends thereof such that the internally threaded front ends are manually pivotal radially of the nipple chuck axis. In use, the segments are closed about the threaded end of the nipple blank which is then securely grasped by radial engagement of the machine chuck jaws with the segments. Following threading of the unthreaded end of the nipple blank, the nipple chuck is removed from the machine chuck jaws, and the segments are manually pivoted to an open position to release the nipple.

21 Claims, 5 Drawing Sheets

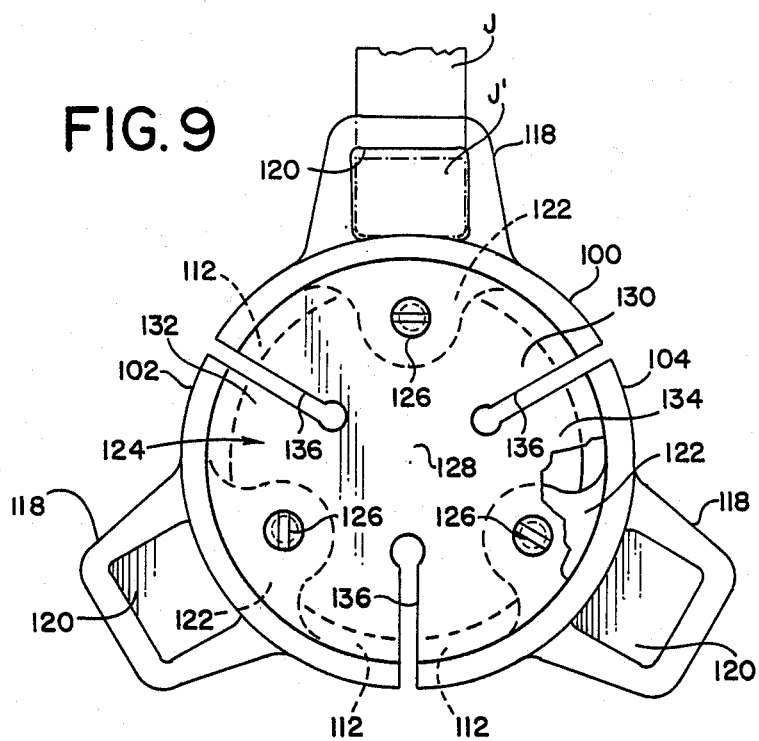
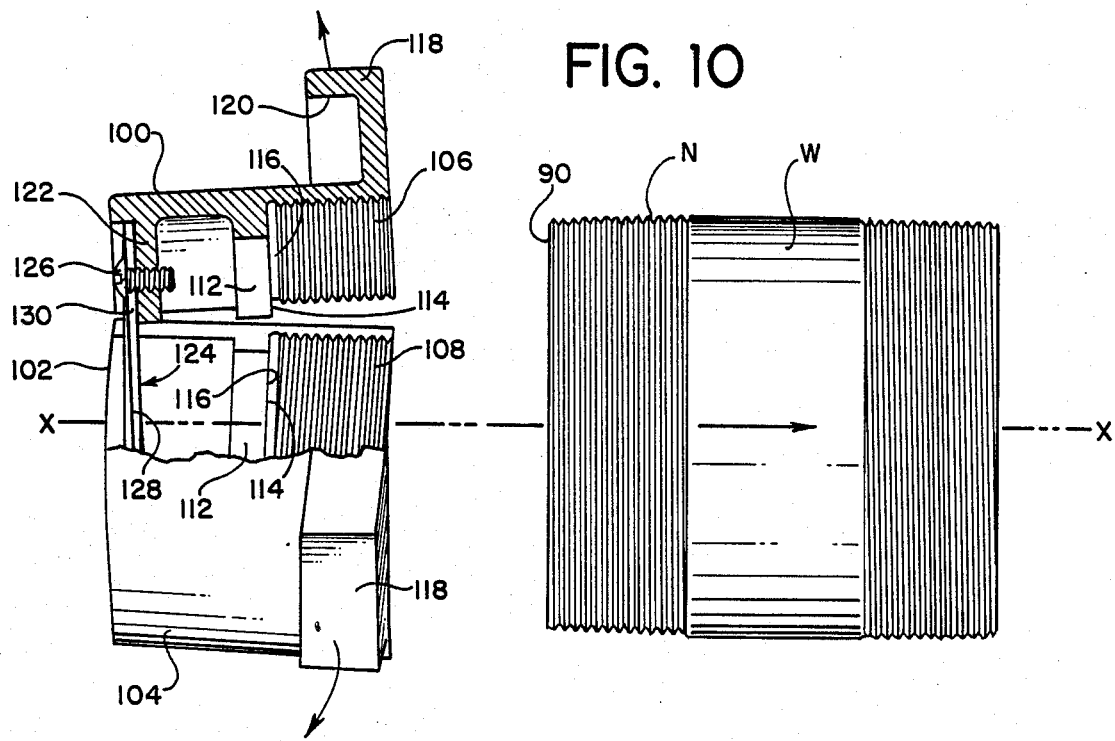

NIPPLE CHUCK

BACKGROUND OF THE INVENTION

The present invention relates to the art of power driven threading machines, and more particularly to a nipple chuck for holding a threaded end of a pipe nipple workpiece in a power driven pipe threading machine while an unthreaded end of the nipple is threaded.

It is of course well known that power driven pipe threading machines are used to cut, bevel and/or thread one or both ends of a length of pipe. Such pipe threading machines comprise a spindle through which a length of pipe can extend, a chuck assembly for gripping and rotating the pipe, and tools for cutting, reaming and/or threading an end of the pipe as it is rotated. The chuck assembly includes a machine chuck mounted on the spindle for rotation therewith and which chuck includes an axial passage through which the workpiece extends from the spindle to the cutting tools. A number of chuck jaws, usually three, are carried on the machine chuck and are shiftable radially of the spindle axis between an operating position firmly gripping the pipe and an open position releasing the pipe.

The cutting tools are generally mounted on the threading machine so as to be movable into and out of operating positions relative to the workpiece, and the thread cutting tool generally is in the form of a die head supporting threading dies and shiftable along the working axis of the machine to accommodate different pipe lengths.

In connection with producing pipe nipples which are short pieces of pipe threaded at both ends, a length of pipe is first fed from the rear of the machine through the spindle and chuck assembly to advance the pipe into a working position relative to the cutting tools. The machine chuck jaws are then securely engaged with the pipe, the machine chuck is rotated by the power driven spindle, and short pipe sections are successively threaded at one end and then cut as the pipe is intermittently advanced through the machine. These short pipe sections are then threaded at the other ends thereof to produce pipe nipples and, in connection with such threading, a nipple chuck is required to firmly grip the previously threaded end to enable rotation of the workpiece without deforming the previously cut threads.

Nipple chucks are well known and heretofore have included a wide variety of structures generally in the form of radially displaceable collet sections having internal threads matching the externally threaded pipe nipple. Further, such previous nipple chucks have included a rigid shaft or the like on which the collet sections are mounted and by which the nipple chuck is held in the machine chuck jaws, and radially or axially displaceable cams are employed to displace the collet sections against the pipe nipple. Prior nipple chucks of the foregoing character are disadvantageous for a number of reasons. In this respect, they are heavy, structurally complex assemblies which are cumbersome to use in that the mounting shaft has to be introduced into the machine chuck jaws, and then another separate camming component or the like has to be actuated to displace the collet sections radially onto the pipe nipple workpiece. The camming component has to be manually shifted to displace the collet sections and, often, a locking mechanism is required to hold the camming component firmly in place during operation of the machine. It will be appreciated, therefore, that such nipple chucks require several accurately machined moving parts, and such parts are not only very expensive to manufacture and assemble, but result in an assembly in which the parts are prone to become misaligned and to jamming during use. The presence of metal scrap in connection with operating a pipe threading machine introduces a further problem with respect to interfering with the relative movement between component parts of such nipple chucks.

Other known nipple chucks include internally threaded unitary chucks which have no moving parts but which require the operator to manually screw each pipe nipple into the chuck threads, and then to manually unscrew the nipple therefrom following the threading operation. This unduly time consuming operation consumes the operator's time and thus adds to the expense of the threading operation. Also, scrap metal particles will inevitably be deposited within the threaded interior of the chuck causing binding between the threads of the chuck and the nipple. Binding also often occurs in such unitary chucks as a result of the nipple being screwed into the chuck during the threading operation. It will be appreciated that any such binding not only encumbers separation of the nipple from the chuck but also subjects the operator to potential injury in connection with such separation should, for example, his hand slip on the threaded end of the nipple which has to be grasped and manually turned to remove the nipple from the chuck.

SUMMARY OF THE INVENTION

The present invention contemplates a new and improved nipple chuck which overcomes the above referred to disadvantages and others and provides a nipple chuck which is structurally economic to produce, which is of lightweight construction, and which is easy for an operator to use. More particularly in this respect, a nipple chuck in accordance with the present invention is comprised of a plurality of arcuate segments internally threaded and interconnected such that the threaded ends thereof are manually pivotal radially relative to the chuck to permit insertion of a pipe nipple workpiece therebetween and closure of the segments about the nipple workpiece threads. The closed sleeve is then inserted into a machine chuck as a unit and the segments are directly compressively engaged between the jaws of the machine chuck. Accordingly, it will be appreciated that structural simplicity and economical production as well as use in handing are promoted by avoiding the use of component parts heretofore required to achieve the separate functions of a support for mounting the nipple chuck in a threading machine and sleeves, cams and the like for manipulating the chuck jaws to introduce and remove a nipple blank and completed nipple therefrom. Moreover, by eliminating such sleeves, cams and the like, the potential problems of jamming thereof and misalignment therebetween are avoided.

In accordance with one embodiment of the invention the foregoing advantages are achieved by providing a nipple chuck comprised of three arcuate segments together forming a sleeve and wherein the arcuate segments are pivotally mounted on a common pivot block or mounting member disposed in a plane perpendicular to the sleeve axis. In accordance with another embodiment, the three arcuate segments are interconnected by a common resilient mounting member preferably in the form of a resilient spring metal disc providing three arcuate sectors to which the three segments of the nipple chuck are attached. In either case, the common mounting member enables the nipple chuck segments to pivot radially outwardly of the chuck axis such that the internally threaded opening defined by the segments is enlarged to facilitate the introduction and removal of the threaded end of a pipe nipple relative to the nipple chuck.

It is accordingly an outstanding object of the present invention to provide a pipe nipple chuck which is structurally simple and inexpensive to manufacture, and which is efficient and convenient for an operator to use in a power driven pipe threading machine.

Another object of the invention is to provide a nipple chuck comprised of a plurality of segments which freely open and close on a threaded end of a pipe nipple, and by which enables the nipple to be firmly grasped without the need for cams or other moving parts to control opening and closing of the chuck segments.

Another object of the invention is to provide a nipple chuck of the foregoing character which is easily manually handled by an operator and which is adapted to be placed on and removed from a threaded end of a pipe nipple without the need for threading the nipple into and out of the chuck.

Still another object of the invention is to provide a nipple chuck of the foregoing chamber which is adapted to be directly compressively engaged in the jaws of a threading machine chuck, thus to minimize the time required to assemble, thread and disassemble a pipe nipple to be worked on.

Yet another object of the present invention is to provide a nipple chuck of the foregoing character which provides clear access to the internal threads thereof for inspection and cleaning.

BRIEF DESCRIPTION OF THE DRAWINGS

FIG. 9 is a rear elevational view, partially in section, looking in the direction of line 9—9 in FIG. 7; and, FIG. 10 is a side elevation view, partially in section, showing the nipple chuck in FIG. 6 in an open position, and showing a finished workpiece adjacent thereto.

DESCRIPTION OF A PREFERRED EMBODIMENT

Figure 1:
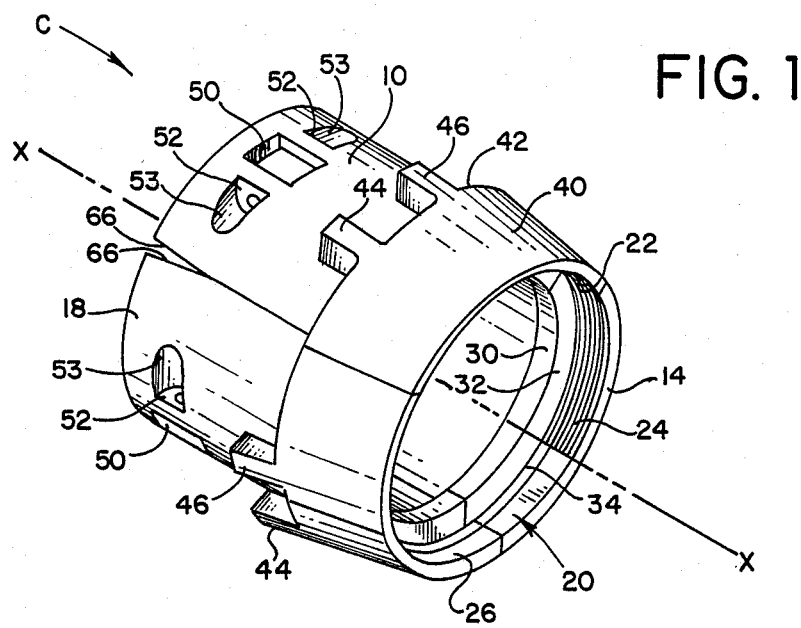
FIG. 1 is a perspective view of a nipple chuck in accordance with the present invention.
Figure 2:
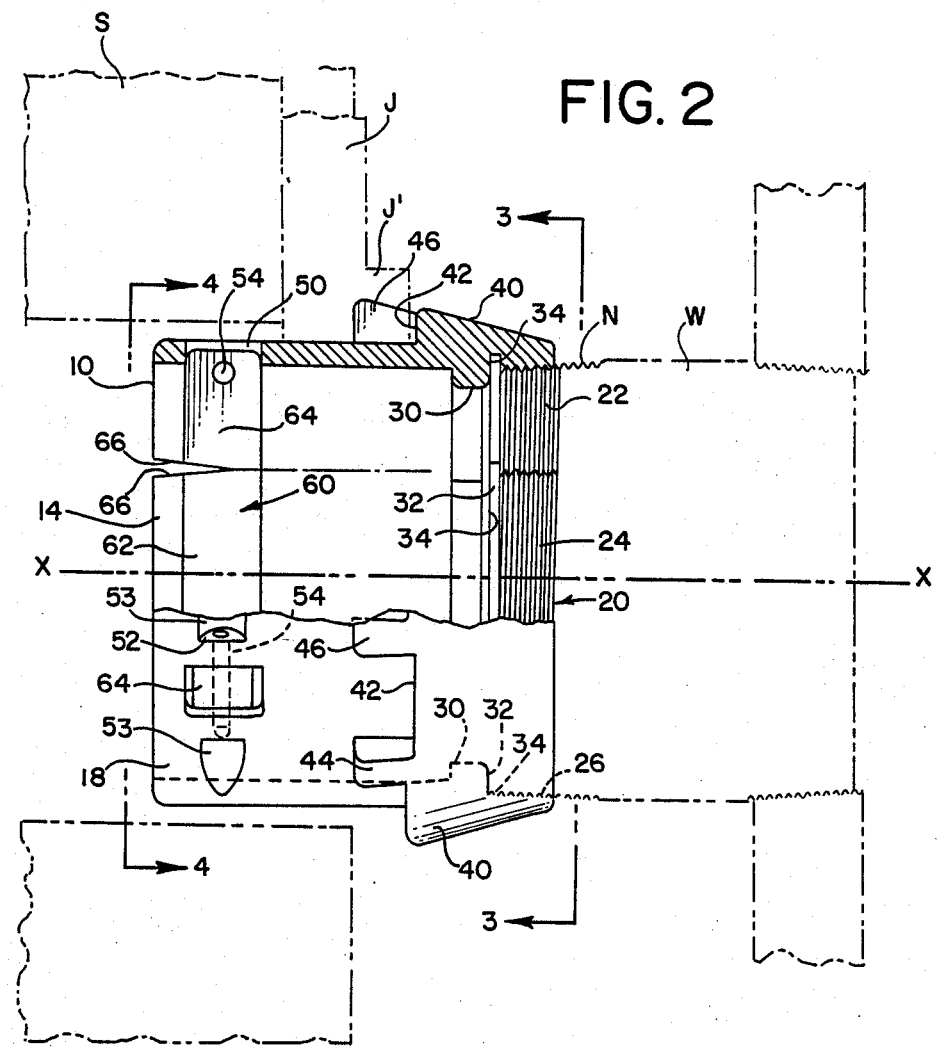
FIG. 2 is a side elevation view, partially in section, of the nipple chuck shown in FIG. 1 and showing the chuck in assembled relationship with a threading machine chuck, a workpiece and a thread cutting die.
Figure 3:
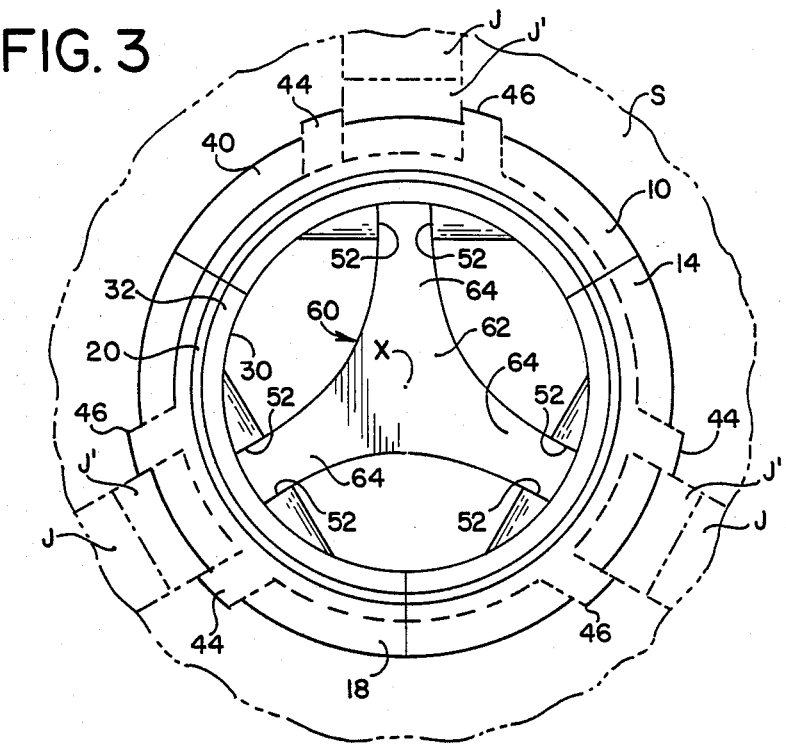
FIG. 3 is a front elevational view looking in the direction of line 3—3 in FIG. 2.
Figure 4:
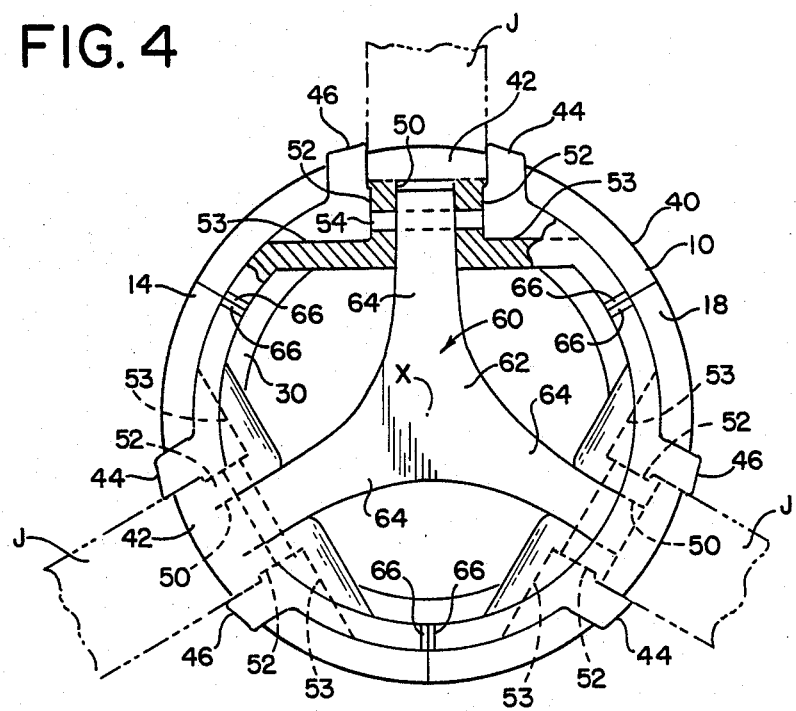
FIG. 4 is a rear elevational view, partially in section, looking in the direction of line 4—4 in FIG. 2.

Referring now to the drawings wherein the showings are for the purpose of illustrating preferred embodiments of the invention only and not for the purpose of limiting same, in FIGS. 1-5 there is shown a nipple chuck C comprised of three arcuate sleeve segments 10, 14, and 18. Sleeve segments 10, 14 and 18 are of substantially equal arcuate extent and combine to form a sleeve having an axis X. The front end of nipple chuck C is internally threaded as indicated by numeral 20, whereby the chuck is adapted to accommodate a nipple workpiece W having a corresponding external thread N coaxial with axis X. Thread 20 is defined by internally threaded portions 22, 24 and 26 respectively formed at the forward ends of arcuate sleeve segments 10, 14 and 18. Thread 20 is shown as a straight thread, but it will be appreciated that it could be tapered. Sleeve segments 10, 14 and 18 are substantially identical and it will be appreciated of course that the threaded portions 22, 24 and 26 are cut and the segments arranged for thread 20 to be continuous about the interior of the nipple chuck.

Each of the segments 10, 14 and 18 includes an internal flange 30 which is circumferentially coextensive therewith and which projects radially thereof. Each flange 30 provides a corresponding stop surface 32 lying in a plane perpendicular to axis X and facing forward toward thread 20. Each segment is further provided with a thread relief groove 34 circumferentially coextensive therewith and axially between the corresponding flange 30 and segment thread The exterior of each chuck segment is provided with a tapered collar section 40 formed at the forward end thereof and having a rear surface 42 lying in a plane perpendicular to axis X. Circumferentially spaced apart ribs 44 and 46 are provided on each segment to facilitate the positioning and supporting of chuck C in a threading machine, as explained more fully hereinafter.

The arcuate sleeve segments 10, 14 and 18 are mounted on a common connecting or mounting member, as described hereinafter, and to facilitate such mounting each segment is provided with an opening 50 radially therethrough and radially inwardly extending mounting elements 52. Opening 50 is provided centrally with respect to the arcuate extent of each sleeve segment and rearwardly of and centrally relative to the corresponding ribs 44 and 46. Mounting elements 52 are on circumferentially opposite sides of opening 50 and have aligned apertures for receiving a corresponding mounting and pivot pin 54 for the purpose set forth hereinafter. The exterior of each segment is recessed on circumferentially opposite sides of opening 50, as indicated by number 53, to provide access to mounting elements 52 and pin 54. A sleeve connecting or mounting member 60 is provided to support sleeve segments 10, 14 and 18 in position relative to one another In the embodiment shown, the sleeve connecting member is a generally Y-shaped member 60 comprised of a central portion 62 and three support legs 64, of equal length extending radially from the central portion. Legs 64 are equally spaced apart circumferentially, and each leg extends radially between a pair of mounting elements 52 of a corresponding one of the segments 10, 14 and 18 and into the corresponding opening 50. Each leg 64 is provided with a bore aligned with the apertures in mounting elements 52 so as to receive the corresponding mounting and pivot pin 54. Thus, each of the segments 10, 14 and 18 is pivotal radially outwardly relative to axis X from the closed position shown in FIG. 1 to the open position shown in FIG. 5. To facilitate such opening displacement, the longitudinal edges of each of the segments 10, 14 and 18 are tapered at the rearward ends thereof as designated by numerals 66 in FIGS. 1 and 4.

Figure 5:
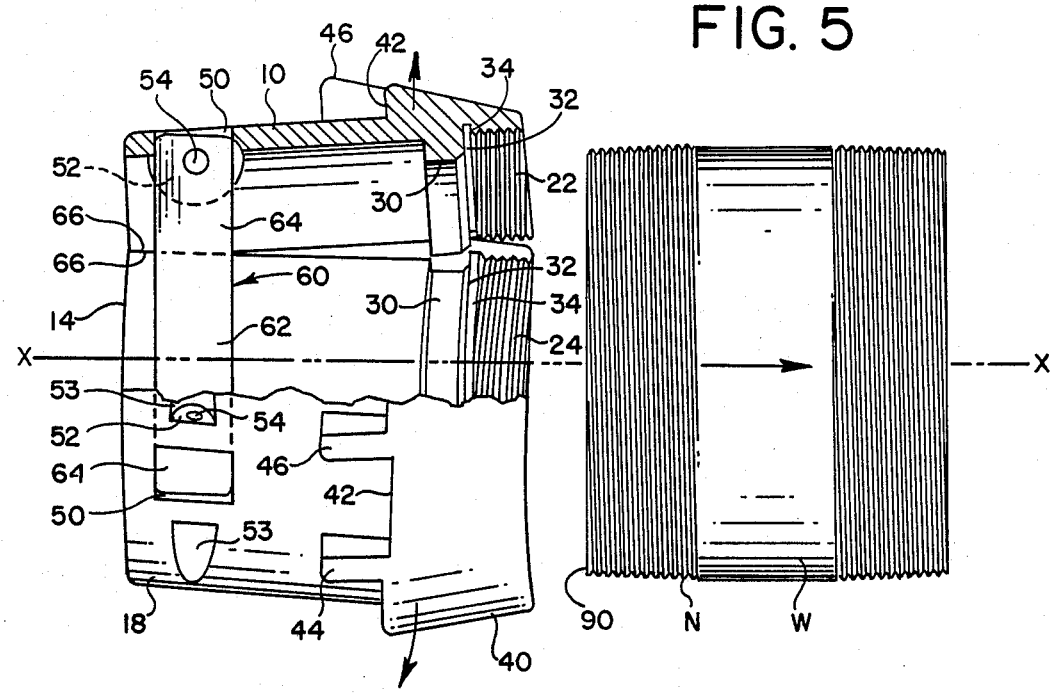
FIG. 5 is a side elevation view, partially in section, showing the nipple chuck in FIG. 1 in an open position, and showing a finished workpiece adjacent thereto.
Figure 6:
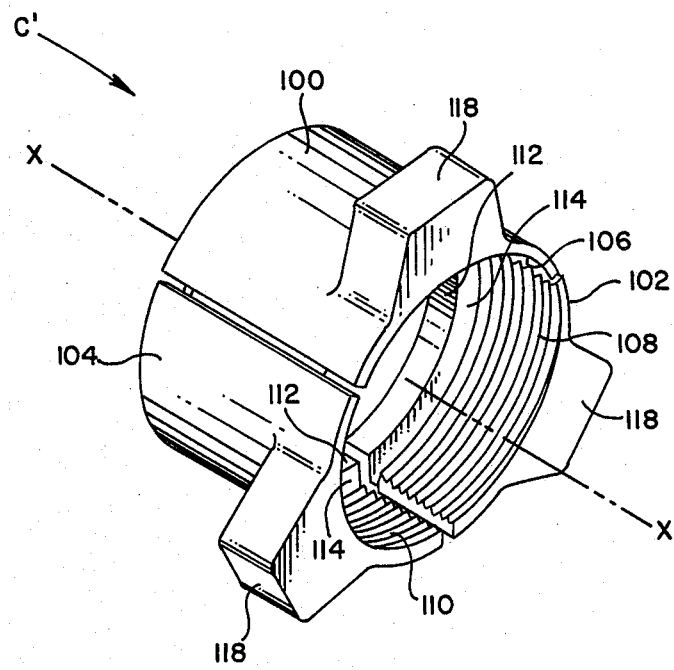
FIG. 6 is a front perspective view of another embodiment of a nipple chuck in accordance with the present invention.
Figure 7:
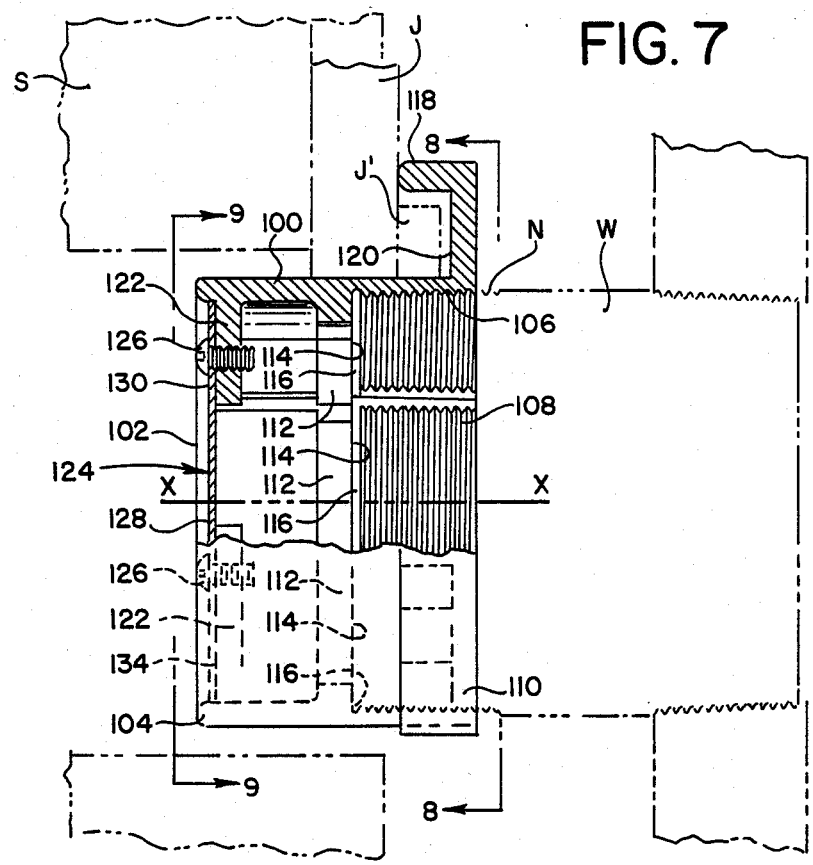
FIG. 7 is a side elevation view, partially in section, of the nipple chuck shown in FIG. 6 and showing the chuck in assembled relationship with a threading machine chuck, a workpiece and a thread cutting die.
Figure 8:
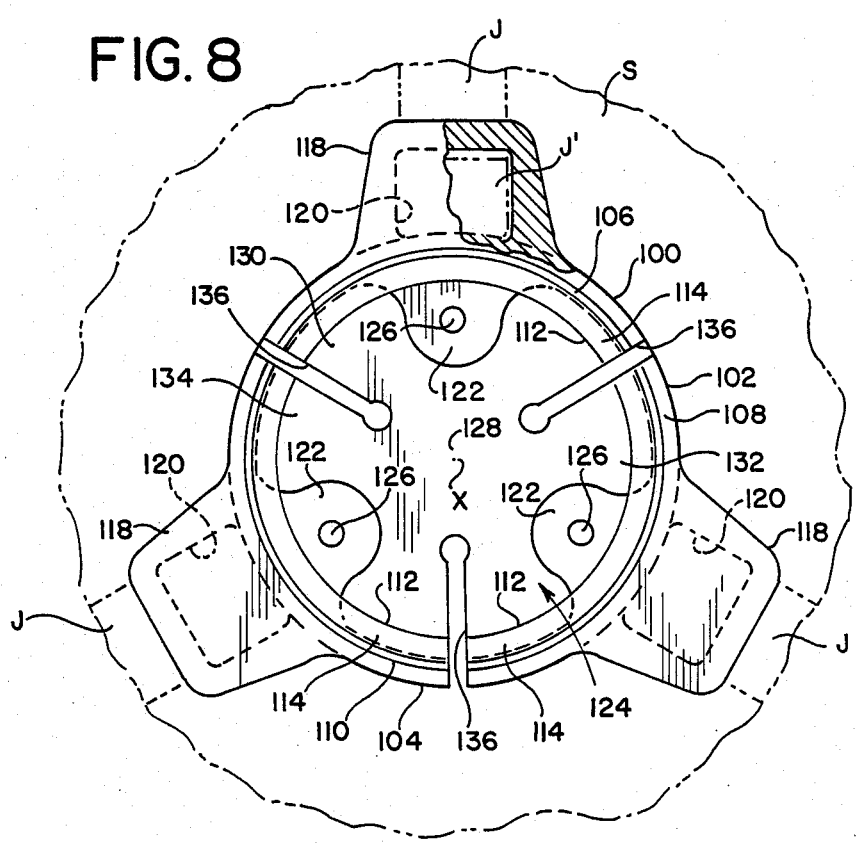
FIG. 8 is a front elevational view looking in the direction of line 8—8 in FIG. 7.

In use, nipple C is first disposed in its open position with the threaded forward end thereof adjacent a nipple workpiece W as best shown in FIG. 5. While both ends of workpiece W are shown in FIG. 5 as being threaded, it will be appreciated that the right hand end initially is not threaded and is threaded in connection with use of chuck C as described below. The hinged connection between each sleeve segment 10, 14 and 18 and connecting member 60 permits the forward ends of segments 10, 14 and 18 to pivot radially outwardly, and the tapered edges 66 limit radial spreading of thread portions 22, 24 and 26. The workpiece is then moved axially into the nipple chuck until thread N extends thereinto a distance substantially equal to the axial length of internal thread 20. Sleeve segments 10, 14 and 18 are then pivoted back to the closed position in which internal thread sections 22, 24 and 26 mesh with nipple thread N. If necessary end 90 of nipple workpiece W may be advanced axially inwardly to engage against stop surface 32 by a slight manual rotation of workpiece W about axis X. Nipple chuck C, having nipple workpiece W engaged therein, is then inserted axially into the bore of a chuck and spindle assembly S of a threading machine, as will be appreciated from FIG. 2. When properly positioned, jaw portions J' of jaws J of the chuck and spindle assembly S are between corresponding pairs of ribs 44 and 46, and jaws J are then moved radially inwardly between the pairs of ribs to engage against sleeve segments 10, 14 and 18. Axial insertion of nipple chuck C into the chuck and spindle assembly S is limited by abutting contact between rear collar surface 42 and machine chuck jaws J, and the area between ribs 44 and 46 is circumferentially centrally located relative to the corresponding chuck segment whereby the distribution of compression loading of the chuck by jaws J is optimized. Further, ribs 44 and 46 advantageously preclude relative rotational displacement between the nipple chuck and jaws J during threading of the nipple blank. Radial inward displacement of jaws J causes the jaws to engage and hold sleeve segments 10, 14 and 18 in the closed position, and rotation of chuck and spindle assembly S and thus jaws J rotates nipple chuck C and thus workpiece W. A thread cutting die head is then advanced axially inwardly of the unthreaded outer end of rotating workpiece W, whereby the latter end is threaded. When the outer end has been threaded, the operator disengages nipple chuck C from machine chuck jaws J, whereby sleeve segments 10, 14 and 18 are free to pivot radially outwardly to the open position thereof to release the finished nipple.

Manual handling of nipple chuck C is facilitated by ribs 44 and 46 which provide convenient handling surfaces for lifting the chuck and radially opening the chuck segments.

Another embodiment of the invention is shown in FIGS. 6-10, wherein a nipple chuck C' is illustrated as being comprised of three arcuate sleeve segments 100, 102 and 104. Sleeve segments 100, 102 and 104 are substantially identical, and the interiors thereof at the outer end of the chuck are similar to the corresponding portion of segments 10, 14 and 18 and described in connection with the embodiment of FIGS. 1-5. In this respect, the segments 100, 102 and 104 have corresponding internally threaded portions 106, 108 and 110, respectively, and each segment has an arcuate internal flange 112 providing a stop surface 114 and a thread relief groove 116. The exterior of each sleeve segment 100, 102 and 104 is provided at the forward end thereof and generally centrally relative to its circumferential extent with a radially extending projection 118 having a rearwardly facing cavity 120 which serves the purpose set forth hereinafter. The interior of each segment is provided at the rearward end thereof with a mounting projection 122 extending radially inwardly of the corresponding segment, and the three segments are interconnected relative to one another by means of a connecting member 124 fastened to mounting projections 122 by threaded fasteners 126. More particularly, connecting member 124 is preferably produced from flat spring sheet metal and includes a central portion 128 and three sector like leg portions 130, 132 and 134 extending radially from central portion 128 and separated from one another by radial slots 136. Thus, each of the portions 130, 132 and 134 is independently flexible relative to central portion 128. Each of the leg portions 130, 132 and 134 is apertured circumferentially centrally thereof to receive the corresponding fastener 126 by which the mounting member and segments are interconnected.

In use, nipple chuck C' is manually handled in a manner somewhat similar to nipple chuck C described in connection with FIGS. 1-5. In this respect, the chuck segments are radially opened against the bias of mounting member 124 to introduce or remove nipple workpiece W and the chuck, with the workpiece therein, is introduced as a unit into the spindle and chuck assembly S of a threading machine in connection with threading the opposite end of the workpiece. Projections 118 and cavities 120 therein provide a convenient arrangement by which the segments can be pivoted radially outwardly against the resilient bias of the flexible mounting member from the closed positioning thereof shown in FIG. 6 to the open positions shown in FIG. 10. Further, cavities 120 are sized to receive jaw portions J' of the threading machine spindle and chuck assembly S, thus serving to properly position nipple chuck C' relative to jaws J, thus to assure the desired even distribution of compressive force on the chuck segments when jaws J are displaced to grip and hold the nipple chuck during the threading operation. Further, the cavities interengage with the chuck jaws to preclude relative rotation between the nipple chuck and jaws during threading.

While considerable emphasis has been placed herein on the preferred embodiments of the invention, it will be appreciated that other embodiments as well as modifications of the disclosed embodiments can be made without departing from the principles of the present invention. For example in this respect, while ribs 44 and 46 and cavities 120 advantageously optimize positioning of the nipple chuck relative to the machine chuck jaws and assure against relative rotation between the nipple chuck and jaws during threading of a nipple blank, such functions are not absolutely essential and, moreover, can be achieved with other structural arrangements such as recesses radially inwardly of the outer surfaces of the segments. Further, while the resilient mounting member 124 preferably normally supports the chuck segments in the closed positions thereof, it will be appreciated that the mounting member and segments could be structured for the latter to normally be in the open positions thereof and thus closed about a nipple blank against the resilient bias of the mounting member Still further, the stop flanges need not be circumferentially coextensive with the corresponding segment nor provided on all of the segments to provide the desired function thereof.

The foregoing and other modifications of the preferred embodiments as well as other embodiments, will be suggested to others upon reading and understanding the foregoing specification. Accordingly, it is to be distinctly understood that the foregoing descriptive matter is to be interpreted merely as illustrative of the invention and not as a limitation.

Having thus described the invention, it is claimed:

1. A nipple chuck for supporting a nipple blank having a threaded end and an unthreaded end for rotation relative to tool means of a power driven thread cutting machine having a plurality of workpiece gripping jaw means rotatable about a machine axis, said nipple chuck having an axis and being mountable between said jaw means for coaxial rotation therewith, said chuck comprising a plurality of arcuate chuck segments forming an open ended sleeve extending about said chuck axis, said segments having corresponding first and second ends and corresponding interior and exterior sides, means axially inwardly adjacent said first ends of said segments supporting each of said segments for pivotal displacement such that said second ends are radially displaceable between open and closed positions relative to said chuck axis, thread means on the interior sides of said segments at said second ends thereof, said thread means engaging said threaded end of a nipple blank when said second ends of said segments are in said closed positions, and said exterior sides of said segments being radially engaged by said gripping jaw means axially between said first and second ends to maintain said second ends in said closed positions about said threaded end of said nipple blank during rotation of said nipple chuck with said jaw means.

2. A nipple chuck as defined in claim 1, wherein said means axially inwardly adjacent said first ends of said segments comprises a connecting member transverse to said chuck axis, and means connecting each of said segments to said connecting member.

3. A nipple chuck as defined in claim 2, wherein said connecting member includes a central portion and a plurality of legs extending radially outwardly from said central portion and corresponding in number to said plurality of segments, each of said legs having a radially outer end, and said means connecting said segments to said connecting member including means connecting the outer end of each leg to the corresponding segment.

4. A nipple chuck according to claim 3, wherein said means connecting the outer end of each leg to the corresponding segment comprises means providing a hinged connection between each leg and the corresponding segment.

5. A nipple chuck for supporting a nipple blank having a threaded end and an unthreaded end for rotation relative to tool means of a power driven thread cutting machine having a plurality of workpiece gripping jaw means rotatable about a machine axis, said nipple chuck having an axis and being mountable between said jaw means for coaxial rotation therewith, said chuck comprising a plurality of arcuate chuck segments extending about said chuck axis, said segments having corresponding first and second ends and corresponding interior and exterior sides, means adjacent said first ends of said segments supporting said segments for pivotal displacement such that said second ends are radially displaceable between open and closed positions relative to said chuck axis, thread means on the interior sides of said segments at said second ends thereof, said thread means enganging said threaded end of a nipple blank when said second ends of said segments are in said closed positions, said exterior sides of said segments being radially engaged by said gripping jaw means axially between said first and second ends to maintain said second ends in said closed positions about said threaded end of said nipple blank during rotation of said nipple chuck with said jaw means, said means adjacent said first ends of said segments comprising a connecting member transverse to said chuck axis, means connecting each of said segments to said connecting member, said connecting member including a central portion and a plurality of legs extending radially outwardly from said central portion and corresponding in number to said plurality of segments, each of said legs having a radially outer end, said means connecting said segments to said connecting member including means connecting the outer end of each leg to the corresponding segment, said connecting member being of planar resilient sheet metal and said legs being flexible relative to said central portion, and said means connecting the outer end of each leg to the corresponding segment comprising a rigid connection between each said leg and the corresponding segment.

6. A nipple chuck as defined in claim 1, and means on the interior side of at least one of said segments providing a stop surface axially inwardly of said thread means at said second ends said segments.

7. A nipple chuck as defined in claim 6, wherein said means providing a stop surface includes flange means circumferentially coextensive with said at least one segment.

8. A nipple chuck for supporting a nipple blank having a threaded end and an unthreaded end for rotation relative to tool means of a power driven thread cutting machine having a plurality of workpiece gripping jaw means rotatable about a machine axis, said nipple chuck having an axis and being mountable between said jaw means for coaxial rotation therewith, said chuck comprising a plurality of arcuate chuck segments extending about said chuck axis, said segments having corresponding first and second ends and corresponding interior and exterior sides, means adjacent said first ends of said segments supporting said segments for pivotal displacement such that said second ends are radially displaceable between open and closed positions relative to said chuck axis, thread means on the interior sides of said segments at said second ends thereof, said thread means engaging said threaded end of a nipple blank when said second ends of said segments are in said closed positions, said exterior sides of said segments being radially engaged by said gripping jaw means axially between said first and second ends to maintain said second ends in said closed positions about said threaded end of said nipple blank during rotation of said nipple chuck with said jaw means, and said exterior side of each of said plurality of segments including positioning means circumferentially centrally thereof receiving a corresponding one of said gripping jaw means to position said nipple chuck relative to said jaw means.

9. A nipple chuck as defined in claim 8, wherein said position means includes means to position said nipple chuck axially and circumferentially relative to said jaw 10. A nipple chuck as defined in claim 8, wherein said means axially inwardly adjacent said first ends of said segments comprises a connecting member transverse to said chuck axis, and means connecting each of said segments to said connecting member.

11. A nipple chuck as defined in claim 10, wherein said connecting member includes a central portion and a plurality of legs extending radially outwardly from said central portion and corresponding in number to said plurality of segments, each of said legs having a radially outer end, and said means connecting said segments to said connecting member including means connecting the outer end of each leg to the corresponding segment.

12. A nipple chuck according to claim 11, wherein said means connecting the outer end of each leg to the corresponding segment comprises means providing a hinged connection between each leg and the corresponding segment.

13. A nipple chuck as defined in claim 12, and means on the interior side of at least one of said segments providing a stop surface axially inwardly of said thread means at said second ends of said segments.

14. A nipple chuck as defined in claim 13, wherein said positioning means includes means to position said nipple chuck axially and circumferentially relative to said jaw means.

15. A nipple chuck as defined in claim 14, wherein said positioning means includes a pair of axially extending circumferentially spaced apart ribs on said exterior sides of said segments.

16. A nipple chuck as defined in claim 11, wherein said connecting member is of planar resilient sheet metal and said legs are flexible relative to said central portion, and wherein said means connecting the outer end of each leg to the corresponding segment comprises a rigid connection between each said leg and the corresponding segment.

17. A nipple chuck as defined in claim 16, and means on the interior side of at least one of said segments providing a stop surface axially inwardly of said thread means at said second ends of said segments.

18. A nipple chuck as defined in claim 17, wherein said means providing a stop surface includes flange means circumferentially coextensive with said at least one segment.

19. A nipple chuck as defined in claim 17, wherein said positioning means includes means to position said nipple chuck axially and circumferentially relative to said jaw means.

20. A nipple chuck as defined in claim 19, wherein said positioning means includes a projection extending radially outwardly from said exterior side of each segment and having a recess opening in the direction toward said first ends of said segments.

21. A nipple chuck as defined in claim 1, wherein said means axially inwardly adjacent said first ends of said segments comprises a connecting member of planar resilient sheet material transverse to said chuck axis and having a central portion and a plurality of legs extending radially outwardly from said central portion and corresponding in number of said plurality of segments, said legs being flexible relative to said central portion and having a radially outer end, and means rigidly connecting the outer end of each leg to a corresponding one of said segments.

* * * * *

UNITED STATES PATENT AND TRADEMARK OFFICE
CERTIFICATE OF CORRECTION

PATENT NO. : 4,795,175

DATED : January 3, 1989

INVENTOR(S) : Larry F. Babb, Michael J. Rutkowski

It is certified that error appears in the above-identified patent and that said Letters Patent is hereby corrected as shown below:

Column 3, line 28 actual, "chamber" should read -- character --. Column 5, line 8, after "nipple" insert -- chuck --. Column 8, line 33, after "ends" insert -- of --; line 67, "position" should read -- positioning --; line 68, after "jaw" insert -- means.--.

Signed and Sealed this

Tenth Day of July, 1990

Attest:

HARRY F. MANBECK, JR.

*Attesting Officer*        *Commissioner of Patents and Trademarks*